United States Patent
Amano

(10) Patent No.: US 9,551,515 B2
(45) Date of Patent: Jan. 24, 2017

(54) REFRIGERATION CYCLE APPARATUS AND OUTDOOR HEAT SOURCE UNIT

(71) Applicant: Katsuyuki Amano, Tokyo (JP)

(72) Inventor: Katsuyuki Amano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 428 days.

(21) Appl. No.: 13/803,502

(22) Filed: Mar. 14, 2013

(65) Prior Publication Data

US 2013/0255298 A1 Oct. 3, 2013

(30) Foreign Application Priority Data

Mar. 28, 2012 (JP) ................ 2012-075150

(51) Int. Cl.
   *F25B 29/00* (2006.01)
   *F24F 1/24* (2011.01)
   *F25B 31/00* (2006.01)

(52) U.S. Cl.
   CPC .............. *F25B 29/003* (2013.01); *F24F 1/24* (2013.01); *F25B 31/006* (2013.01);
   (Continued)

(58) Field of Classification Search
   CPC ............ Y02B 30/741; F25B 2600/11; F25B 2600/111; F25B 2700/2103; F25B 2700/21153; F25B 2700/21154; F25B 31/006
   (Continued)

(56) References Cited

U.S. PATENT DOCUMENTS 5,488,279 A * 1/1996 Kawamoto et al. .......... 318/801
7,643,296 B2 1/2010 Yamada et al.
(Continued)

FOREIGN PATENT DOCUMENTS

EP 1 416 230 A1 5/2004
EP 1 684 022 A1 7/2006
(Continued)

OTHER PUBLICATIONS

Office Action mailed Feb. 24, 2015 issued in corresponding JP patent application No. 2012-075150 (and English translation).
(Continued)

*Primary Examiner* — M. Alexandra Elve
*Assistant Examiner* — Joel Attey
(74) *Attorney, Agent, or Firm* — Posz Law Group, PLC

(57) ABSTRACT

There is provided a refrigeration cycle apparatus in which an outdoor heat source unit, an indoor unit, and a water heating unit are connected, and an air conditioning operation and a water heating operation can be performed separately, and an exhaust-heat recovery operation can be performed by simultaneously performing air cooling and water heating. The outdoor heat source unit includes a compressor for compressing refrigerant, a refrigerant air-heat exchanger that performs heat exchange between the refrigerant and outside air, a fan for cooling the refrigerant air-heat exchanger, a control device that includes an inverter device for driving the compressor, and a heat sink for dissipating heat of the inverter device, and a switching element in the inverter device is constituted by an element formed by a wide bandgap semiconductor.

18 Claims, 4 Drawing Sheets

(52) U.S. Cl.
CPC ..... *F25B 2600/021* (2013.01); *F25B 2600/11* (2013.01); *F25B 2600/111* (2013.01); *F25B 2700/2103* (2013.01); *F25B 2700/21153* (2013.01); *F25B 2700/21154* (2013.01); *Y02B 30/741* (2013.01)

(58) Field of Classification Search
USPC ........................................ 62/183, 259.2, 181
See application file for complete search history.

(56) References Cited

U.S. PATENT DOCUMENTS

| | | | |
|---|---|---|---|
| 7,876,574 B2* | 1/2011 | Takeichi et al. | 361/796 |
| 2002/0108384 A1* | 8/2002 | Higashiyama | 62/228.4 |
| 2006/0021364 A1* | 2/2006 | Shimada | H01L 23/467 62/171 |
| 2009/0092501 A1* | 4/2009 | Seibel | 417/44.1 |
| 2009/0122499 A1* | 5/2009 | Takeichi et al. | 361/796 |
| 2010/0083916 A1* | 4/2010 | Shintani | F01P 7/164 123/41.1 |
| 2011/0036113 A1* | 2/2011 | Kopko et al. | 62/324.5 |
| 2011/0101906 A1* | 5/2011 | Tagome | 318/722 |
| 2011/0126568 A1* | 6/2011 | Okuda et al. | 62/259.2 |
| 2011/0296861 A1 | 12/2011 | Honda | |
| 2011/0302949 A1 | 12/2011 | Honda | |
| 2013/0152609 A1* | 6/2013 | Hatakeyama et al. | 62/56 |

FOREIGN PATENT DOCUMENTS

| | | |
|---|---|---|
| EP | 2 355 330 A1 | 8/2011 |
| EP | 2 402 682 A1 | 1/2012 |
| GB | 2 215 091 A | 9/1989 |
| JP | S62-47830 U | 3/1987 |
| JP | H01-256762 A | 10/1989 |
| JP | 04-158135 A | 6/1992 |
| JP | H04-363539 A | 12/1992 |
| JP | 05-196262 A | 8/1993 |
| JP | 07-006652 B2 | 1/1995 |
| JP | 2001-148589 A | 5/2001 |
| JP | 2004-263986 A | 9/2004 |
| JP | 2006-148145 A | 6/2006 |
| JP | 2008-057870 A | 3/2008 |
| JP | 2009-264699 A | 11/2009 |
| JP | 2009-287843 A | 12/2009 |
| JP | 2010-169393 A | 8/2010 |
| JP | 2010-196950 A | 9/2010 |
| JP | 2011-024377 A | 2/2011 |
| JP | 2011-036020 A | 2/2011 |
| JP | 2011-078309 A | 4/2011 |
| JP | 2011-176974 A | 9/2011 |

OTHER PUBLICATIONS

Office Action dated May 23, 2014 issued in corresponding KR patent application No. 10-2013-0030729 (and English translation).
Extended European Search Report dated Mar. 24, 2016 issued in corresponding EP patent application No. 13160702.0.
Buso, S. et al., "Performance Evaluation of a Schottky SiC Power Diode in a Boost PFC Application", IEEE Transactions on Power Electronics, vol. 18, No. 6, Nov. 2003, pp. 1249-1253.

\* cited by examiner

REFRIGERATION CYCLE APPARATUS AND OUTDOOR HEAT SOURCE UNIT

BACKGROUND OF THE INVENTION

1. Field of the Invention

The present invention relates to a refrigeration cycle apparatus in which an exhaust-heat recovery operation can be performed by simultaneously operating air cooling and water heating.

2. Description of the Related Art

Conventionally, there is a type of refrigeration cycle apparatus that includes an outdoor heat source unit and a refrigerant circuit formed by connecting an indoor unit and a water heating unit by piping. The refrigeration cycle apparatus is capable of operating air cooling and water heating separately in a single system, and also capable of operating air cooling and water heating simultaneously (see, for example, Japanese Patent Application Laid-open No. 2010-196950). In this system, exhaust heat generated at the time of air cooling can be recovered for water heating by simultaneously performing an air cooling operation and water heating. Thus, a highly efficient operation can be achieved.

In such type of refrigeration cycle apparatus, by controlling the capacity by using an inverter device as a control device for driving a compressor of an outdoor heat source unit, energy saving is further improved. The inverter device is constituted by a plurality of switching elements, and because a high voltage and a large current flow through the switching elements, a heat loss occurs. The heat loss is forcibly air-cooled by a fan for a refrigerant air-heat exchanger through radiating fins (see, for example, Japanese Patent Application Laid-open No. 5-196262).

However, according to the above conventional techniques, when exhaust heat is recovered by a simultaneous operation of air cooling and water heating, although the compressor of the outdoor heat source unit is required to be operated, the fan of the outdoor heat source unit is not required to be operated because heat exchange is not necessary in the refrigerant air-heat exchanger. On the other hand, when the compressor is driven by the inverter device, it is necessary to operate a fan to radiate the heat in the inverter device. Therefore, there has been a problem in that the operation efficiency is degraded by the power input to the fan.

The present invention has been achieved in view of the above problems, and an object of the present invention is to obtain a refrigeration cycle apparatus that can achieve a high efficiency operation at the time of an exhaust-heat recovery operation.

SUMMARY OF THE INVENTION

It is an object of the present invention to at least partially solve the problems in the conventional technology.

There is provided a refrigeration cycle apparatus according to an aspect of the invention in which an outdoor heat source unit, an indoor unit, and a water heating unit are connected, and an air conditioning operation and a water heating operation can be performed separately, and an exhaust-heat recovery operation can be performed by simultaneously performing air cooling and water heating, wherein the outdoor heat source unit includes a compressor for compressing refrigerant, a refrigerant air-heat exchanger that performs heat exchange between the refrigerant and outside air, a fan for cooling the refrigerant air-heat exchanger, a control device that includes an inverter device for driving the compressor, and a heat sink for dissipating heat of the inverter device, and a switching element in the inverter device is constituted by an element formed by a wide bandgap semiconductor.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a refrigeration cycle apparatus according to the present invention will be explained below in detail with reference to the accompanying drawings. The present invention is not limited to the embodiments.

First Embodiment

Figure 1:
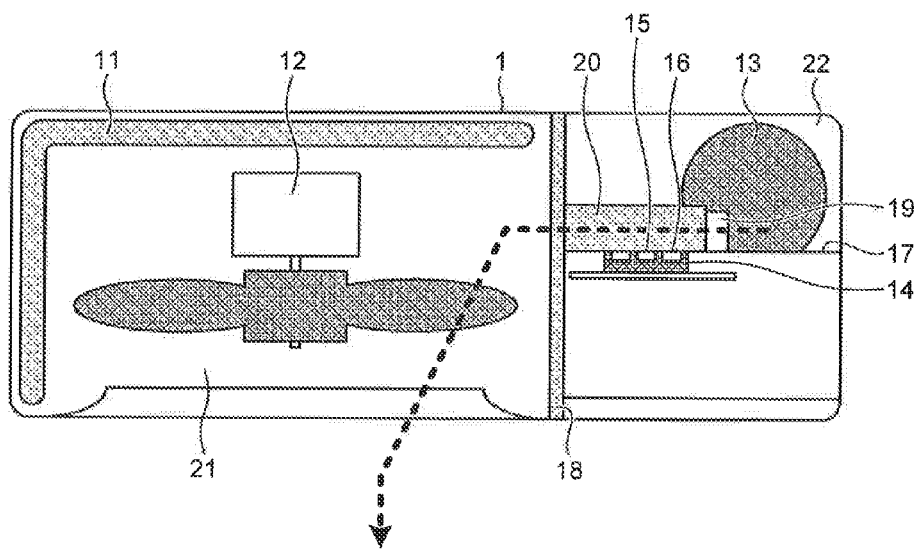
FIG. 1 is a configuration example of an outdoor heat source unit according to a first embodiment of the present invention.

FIG. 1 is a configuration example of an outdoor heat source unit that is included in a refrigeration cycle apparatus according to a first embodiment of the present invention. An outdoor heat source unit 1 includes a refrigerant air-heat exchanger 11, a fan 12, a compressor 13, an inverter device 14 for driving the compressor 13, a switching element 15 in the inverter device 14, a temperature detection unit 16 in the inverter device 14, control device 17 that is an electric part including the inverter device 14, a separator sheet metal 18, a heat sink 19, and a sheet metal duct 20.

In the first embodiment, the switching element 15 in the inverter device 14 is constituted by a wide bandgap semiconductor made of a material such as SIC (silicon carbide) or GaN (gallium nitride). As the material of the wide bandgap semiconductor, besides SiC or a GaN based material, diamond and the like can be used.

The outdoor heat source unit 1 is divided by the separator sheet metal 18 to form a fan cabin 21 and a machine cabin 22. In the fan cabin 21, the refrigerant air-heat exchanger 11 and the fan 12 are arranged. In the machine cabin 22, the compressor 13, the inverter device 14, the control device 17, the heat sink 19, and the sheet metal duct 20 are arranged.

The inverter device 14 is connected to the heat sink 19 arranged at a side of the machine cabin 22, and the heat sink 19 is configured to be covered by the sheet metal duct 20 such that sufficient airflow is provided to a fin portion. As long as sufficient airflow is provided to the fin portion, an air guiding structure such as a duct is not necessary, and it suffices that only the heat sink 19 is arranged.

The separator sheet metal 18 has a hole with the size of the heat sink 19. By driving the fan 12 of the outdoor heat source unit 1, air is taken out of from a side of the machine cabin 22 through this hole via the heat sink 19, thereby forcibly air-cooling the heat sink 19.

Figure 2:
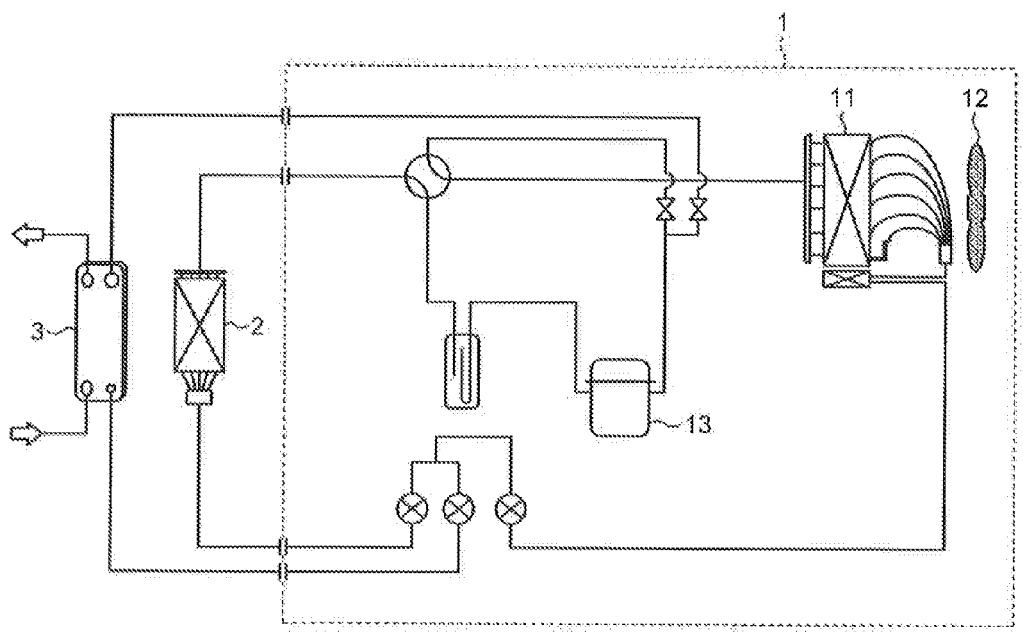
FIG. 2 is a configuration example of a refrigeration cycle apparatus.

A configuration of the refrigeration cycle apparatus including the outdoor heat source unit 1 is explained next. FIG. 2 is a configuration example of the refrigeration cycle apparatus. The refrigeration cycle apparatus is constituted by the outdoor heat source unit 1, an indoor unit 2, and a water heating unit 3. The refrigeration cycle apparatus has a refrigerant circuit that is formed by connecting the outdoor heat source unit 1, the indoor unit 2, and the water heating unit 3 by piping. The refrigeration cycle apparatus is a system in which an air conditioning operation (a cooling operation and a heating operation) and a water heating operation can be performed separately in a single system, and also these operations can be performed simultaneously. Because a four-way valve, an accumulator, a linear expansion valve (LEV), and the like shown in FIG. 2 are general components, detailed explanations thereof will be omitted.

Figure 3:
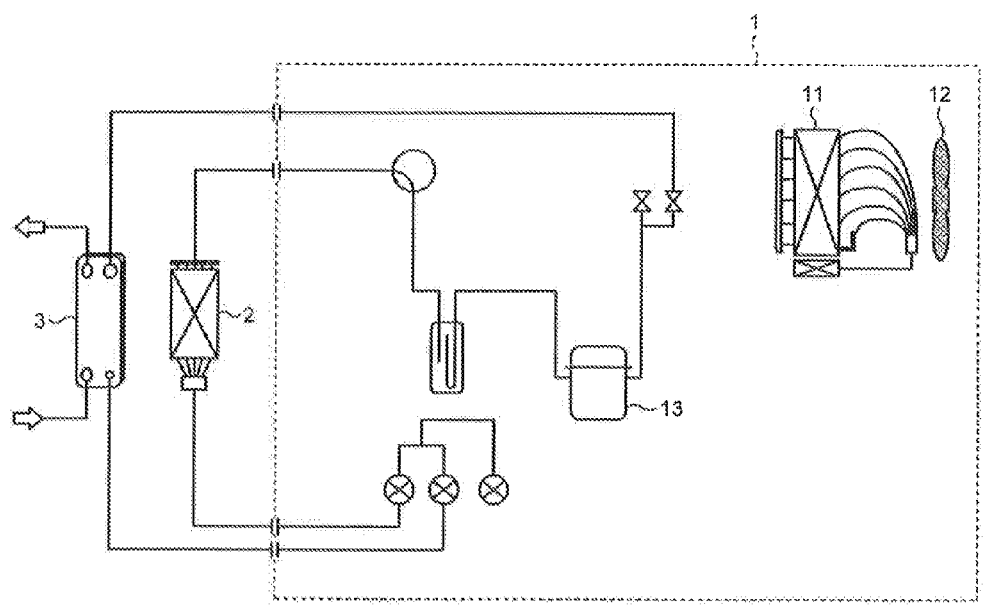
FIG. 3 depicts a connection state in the refrigeration cycle apparatus when an exhaust-heat recovery operation is in progress.

A connection state in the refrigeration cycle apparatus at the time of an exhaust-heat recovery operation is explained. FIG. 3 depicts a connection state in the refrigeration cycle apparatus when an exhaust-heat recovery operation is in progress. As shown in FIG. 3, because refrigerant circulates between the indoor unit 2 and the water heating unit 3 to establish a refrigeration cycle, heat exchange by the refrigerant air-heat exchanger 11 of the outdoor heat source unit 1 is not necessary, and therefore, as a refrigerant circuit, it is not necessary to perform any operation of the fan 12 of the outdoor heat source unit 1.

However, as described above, the compressor 13 of the outdoor heat source unit 1 is in operation also during the exhaust-heat recovery operation. At this time, a large current flows through the switching element 15 of the inverter device 14 to cause a heat loss, and thus the fan 12 of the outdoor heap source unit 1 is required to be operated only to dissipate heat of the inverter device 14.

Therefore, by forming the switching element 15 in the inverter device 14 with a wide bandgap semiconductor made of a material such as SiC or GaN instead of a conventional Si based element, the heat resistance of the switching element 15 is improved. The control device 17 suppresses the operation or the fan 12 during the exhaust-heat recovery operation in which the operation of the fan 12 of the outdoor heat source unit 1 is not necessary as a refrigerant cycle. The power consumed by the fan 12 of the outdoor heat source unit 1 accounts for 2 to 4% of the total input power even in a high efficient direct-current (DC) type, and therefore, if the operation can be stopped when the operation is not required, the energy saving property can be improved.

By replacing the switching element 15 of the inverter device 14 from an Si based element to a wide bandgap semiconductor made of a material such as SiC or GaN, in addition to the improvement of the heat resistance of the element itself, reduction of a heat loss caused by switching such as a recovery loss and a switching loss can be achieved. As for the heat resistance, while a general heat resistance of the switching element 15 formed by a conventional Si based element is up to 150° C. or lower for a semiconductor chip temperature, a wide bandgap semiconductor made of a material such as SiC or GaN realizes a high heat resistance such as that up to around 250° C. for a chip temperature. Therefore, an exhaust-heat recovery operational range while stopping the operation of the fan 12 can be extended.

The exhaust-heat recovery operation is a refrigeration cycle such that the indoor unit 2 performs an air cooling operation and the water heating unit 3 uses exhaust heat thereof for water heating. Accordingly, the exhaust-heat recovery operation is basically performed under a high temperature condition in which an outdoor temperature exceeds 30° C. Therefore, when a heavily-loaded state continues or some abnormalities occur in the refrigeration cycle to increase the current in the compressor 13, even if a wide bandgap semiconductor made of a material such as SiC or GaN is used as the switching element 15, there is a possibility that the temperature increases to exceed the allowable temperature of a semiconductor chip when the operation of the fan 12 is stopped.

As a protection control for such cases, there is prepared a control such that the temperature detection unit 16 arranged on the heat sink 19 or incorporated in the inverter device 14 detects the temperature of the switching element 15 in the outdoor heat source unit 1, and when the temperature exceeds a predetermined threshold, the operation of the fan 12 is performed in a stepwise manner to protect the semiconductor chip from damage from heat.

Figure 4:
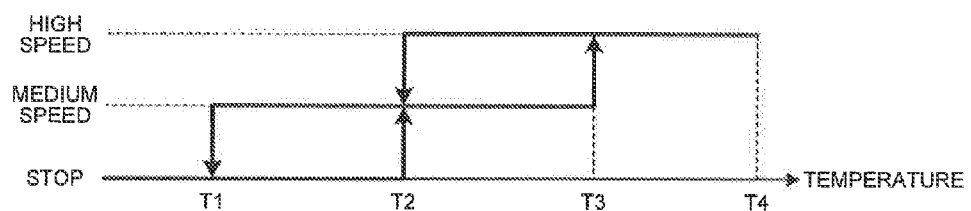
FIG. 4 depicts a relationship between a temperature of a switching element and an operation state of a fan.

FIG. 4 depicts a relationship between a temperature of the switching element 15 and an operation state of the fan 12. An example of a heat protection control is shown in FIG. 4. When the exhaust-heat recovery operation is performed while the fan 12 of the outdoor heat source unit 1 is stopped, upon the temperature of the heat sink 19 or a detected temperature of the temperature detection unit 16 incorporated in the inverter device 14 reaching T2, the control device 17 drives the fan 12 having been stopped to operate at a medium speed. Thereafter, the control device 17 stops the operation of the fan 12 again to return to a power saving operation when the detected temperature decreases to T1, and drives the fan 12 to operate at a high speed when the detected temperature continues to increase to reach T3 even after the operation of the fan 12 is started. Similarly, thereafter, when the detected temperature decreases to T2, the control device 17 drives the fan 12 back to operate at a medium speed, and stops the fan 12 when the detected temperature decreases to T1. In this manner, in the outdoor heat source unit 1, it is possible to extend the operational range and the operation time while the operation of the fan 12 is stopped during the exhaust-heat recovery operation.

If the increase of the detected temperature continues even though the fan 12 is operated at a high speed and reaches T4, the control device 17 recognizes a temperature abnormality and stops the operation of the compressor 13 for protection. As an example, an explanation has been made with four steps of temperatures, which are T1 to T4; however, the present invention is not limited thereto. As long as damage of a semiconductor chip from heat can be avoided, the number of steps can be less or more than four steps.

As explained above, according to the first embodiment, in a refrigeration cycle apparatus in which the outdoor heat source unit 1, the indoor unit 2, and the water heating unit 3 are connected, an air cooling operation and a water heating operation can be performed separately, and an exhaust-heat recovery operation by a simultaneous operation of the air cooling operation and the water heating operation can be performed, the switching element 15 in the inverter device 14 is constituted by an element formed by a wide band gap semiconductor to increase heat resistance of the switching element 15 to reduce a heat loss in the outdoor heat source unit 1. With this configuration, in the outdoor heat source unit 1, the operation of the fan 12 to dissipate heat of the switching element 15 can be suppressed, and therefore the power consumption by the fan 12 can be reduced and a highly efficient operation can be achieved.

Second Embodiment

Figure 5:
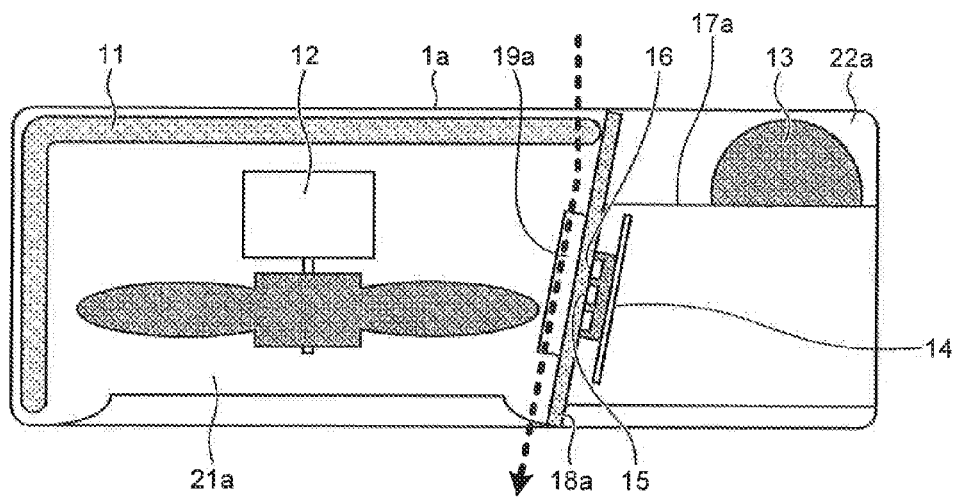
FIG. 5 is a configuration example of an outdoor heat source unit according to a second embodiment of the present invention.

FIG. 5 is a configuration example of an outdoor heat source unit according to a second embodiment of the present invention. An outdoor heat source unit 1a includes the refrigerant air-heat exchanger 11, the fan 12, the compressor 13, the inverter device 14 for driving the compressor 13, the switching element 15 in the inverter device 14, the temperature detection unit 16 in the inverter device 14, a control device 17a that is an electric part including the inverter device 14, a separator sheet metal 1ea, and a heat sink 19a. Similarly to the first embodiment, the switching element 15 in the inverter device 14 is constituted by a wide bandgap semiconductor made of a material such as SiC or GaN.

The outdoor heat source unit 1a is divided by the separator sheet metal 18a to form a fan cabin 21a and a machine cabin 22a. In the fan cabin 21a, the refrigerant air-heat exchanger 11, the fan 12, and the heat sink 19a are arranged. In the machine cabin 22a, the compressor 13, the inverter device 14, and the control device 17a are arranged. The inverter device 14 is configured to be connected to the heat sink 19a arranged at a side of the fan cabin 21a.

Similarly to the first embodiment, by forming the switching element 15 in the inverter device 14 with a wide bandgap semiconductor made of a material such as SiC or GaN instead of forming the switching element 15 by a Si based element, the heat resistance of the element is improved, thereby performing a heat protection control while driving of the fan 12 of the outdoor heat source unit 1a at the exhaust-heat recovery operation is omitted as much as possible. Therefore, detailed explanations thereof will be omitted.

Figure 6:
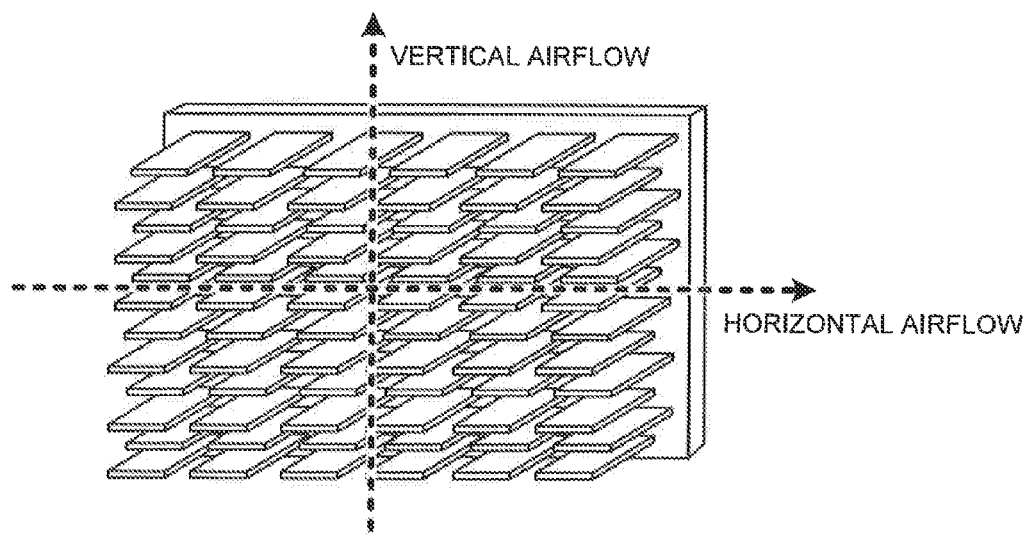
FIG. 6 depicts a shape of a heat sink.

FIG. 6 depicts a shape of the heat sink 19a according to the second embodiment. As shown in FIG. 6, the heat sink 19a has fin shapes that are arranged in such a matrix that airflow in a vertical direction and a horizontal direction of the outdoor heat source unit 1a can be obtained, thereby enhancing heat radiation by natural convection. With such fin shapes and arrangement, air flows in a vertical direction by natural convection in the outdoor heat source unit 1a even when the fan 12 is stooped, and thus the heat radiation performance of the heat sink 19a can be improved.

Also when the fan 12 of the outdoor heat source unit 1a operates such as during an air cooling operation, sufficient heat radiation performance can be obtained by airflow along the separator sheet metal 18a in the outdoor heat source unit 1a. Furthermore, by arranging the angle of the heat sink 19a in such a manner that air flowing along the separator sheet metal 18a does not deviate from fins of the heat sink 19a, it becomes unnecessary to cover the heat sink 19a with the sheet metal duct 20 and the like for guiding air. As a result, it becomes possible to avoid natural convection from being interfered by a sheet metal. With this configuration, in the outdoor heat source unit 1a, the operation time of the fan 12 at the exhaust-heat recovery operation can be further reduced.

Figure 7:
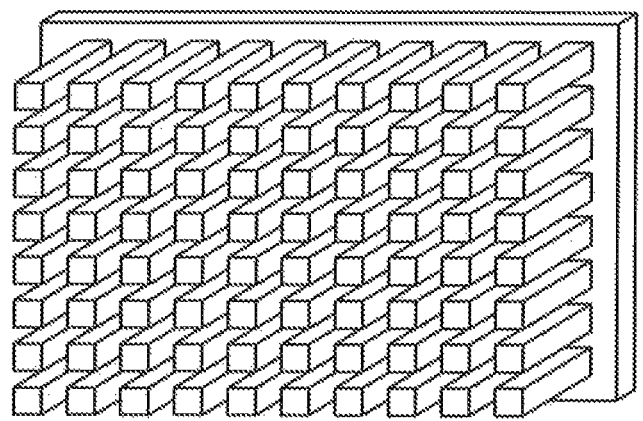
FIG. 7 depicts another shape of the heat sink.
Figure 8:
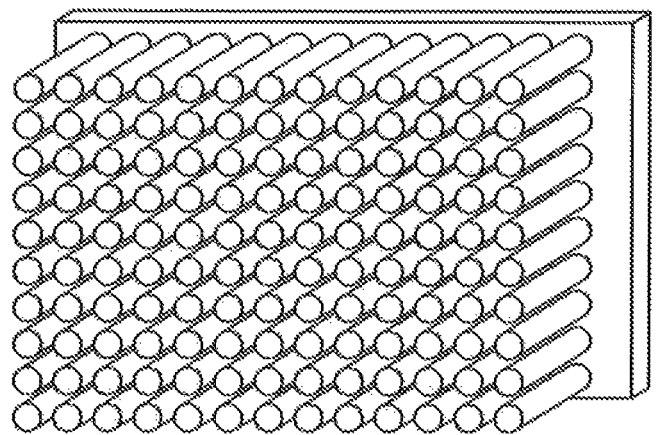
FIG. 8 depicts still another shape of the heat sink.

The shape of the fins of the heat sink 19a is not limited to that shown in FIG. 6. FIGS. 7 and 8 depict other shapes of the heat sink 19a according to the second embodiment. With such a configuration that fins have a prismatic shape or a cylindrical shape and are aligned in a dot matrix as shown in FIGS. 7 and 8, same effects can be obtained.

Generally, in a refrigeration cycle apparatus, such a phenomenon occurs that refrigerant is pooled (accumulated) in the compressor 13 due to the temperature difference among respective constituent elements when an operation of the refrigeration cycle apparatus is stopped. Refrigerant pooled in the compressor 13 can not only cause difficulty in starting the compressor 13 but also can damage the compressor 13. Therefore, in order to prevent refrigerant from being pooled therein, the inverter device 14 performs energization for retaining heat, which is referred to as "constraint energization".

The constraint energization is performed by applying a direct current or a high frequency current to a coil in the compressor 13 by the inverter device 14 to generate heat at the coil or a core of the compressor 13. Although this arrangement causes a heat loss also in the inverter device 14, because the fan 12 of the outdoor heat source unit 1a becomes unnecessary to be operated as a refrigerant cycle during the constraint energization, similarly to during the exhaust-heat recovery operation. Furthermore, because an operation of the fan 12 only to dissipate heat of the inverter device 14 during the outdoor heat source unit 1a is stopped may be determined as a malfunction, the constraint energization has been performed without operating the fan 12 with a controlled amount of energy, so that the temperature of the heat sink 19a does not become too high.

However, with the configuration according to the second embodiment, the heat radiation performance of the heat sink 19a is improved, and a range in which the fan 12 is not required to be operated during the exhaust-heat recovery operation is extended. In addition, the amount of power supplied (input power to the compressor 13) at the constraint energization can be increased, and the controllability is improved such as that a large amount of power can be applied when necessary, thereby reducing a failure of the compressor 13 caused by pooling of the refrigerant.

As described above, according to the second embodiment, in the outdoor heat source unit 1a, the heat sink 19a is arranged in the fan cabin 21a, the fins of the heat sink 19a are arranged in a matrix or in a dot matrix, and the shape of the fins is made into a shape that is suitable for both forced and natural convections. With this configuration, as compared to the first embodiment, the heat dissipation performance is improved in the outdoor heat source unit 1a, and the operation time of the fan 12 during the exhaust-heat recovery operation or the constraint energization can be further reduced. As a result, power consumption by the fan 12 can be reduced and a highly efficient operation can be achieved.

According to the present invention, it is possible to achieve a high efficiency operation at the time of an exhaust-heat recovery operation.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A refrigeration cycle apparatus comprising:
   an outdoor heat source unit, an indoor unit, and a water heating unit that are connected together by refrigerant lines cycling a refrigerant, and the outdoor heat source unit comprises
   a compressor for compressing the refrigerant, a refrigerant air-heat exchanger that performs heat exchange between the refrigerant and outside air, a fan for cooling the refrigerant air-heat exchanger, a control device that includes an inverter device for driving the compressor, a switching element constituted by an element formed by a wide bandgap semiconductor, and a temperature detection unit configured to detect a temperature of the switching element, and a heat sink for dissipating heat of the inverter device, wherein the control device is configured to control an operation of the fan during an exhaust-heat recovery operation of the apparatus based on the detected temperature of the heat sink switching element, and the control device is further configured to operate the fan at a first speed when the detected temperature of the switching element reaches a first temperature, operate the fan at a second speed greater than the first speed when the detected temperature reaches a second temperature greater than the first temperature, and stop the fan when the detected temperature reaches a third temperature lower than the first temperature and the second temperature.

2. The refrigeration cycle apparatus according to claim 1, wherein the control device is configured to control the operation of the fan during the exhaust-heat recovery operation based on a temperature detected by a temperature detection unit in the inverter device.

3. The refrigeration cycle apparatus according to claim 1, wherein the heat sink is arranged at a side of a fan cabin in the outdoor heat source unit, and includes fins arranged in a matrix or fins of cylindrical columns or prismatic columns that are arranged in a dot matrix.

4. The refrigeration cycle apparatus according to claim 1, wherein the wide bandgap semiconductor is made of silicon carbide, a gallium nitride based material, or diamond.

5. An outdoor heat source unit in a refrigeration cycle apparatus in which the outdoor heat source unit, an indoor unit, and a water heating unit are connected by refrigerant lines cycling a refrigerant, the outdoor heat source unit comprising:

a compressor for compressing the refrigerant;

a refrigerant air-heat exchanger that performs heat exchange between the refrigerant and outside air;

a fan for cooling the refrigerant air-heat exchanger;

a control device that includes an inverter device for driving the compressor, the inverter device includes a switching element constituted by an element formed by a wide bandgap semiconductor, the control device further includes a temperature detection unit configured to detect a temperature of the switching element, the control device configured to control an operation of the fan during an exhaust-heat recovery operation based on a temperature of the switching element; and a heat sink for dissipating heat of the inverter device, wherein the control device is further configured to operate the fan at a first speed when the detected temperature of the switching element reaches a first temperature, operate the fan at a second speed greater than the first speed when the detected temperature reaches a second temperature greater than the first temperature, and stop the fan when the detected temperature reaches a third temperature lower than the first temperature and the second temperature.

6. The outdoor heat source unit according to claim 5, wherein the heat sink is arranged at a side of a fan cabin in the outdoor heat source unit, and includes fins arranged in a matrix or fins of cylindrical columns or prismatic columns that are arranged in a dot matrix.

7. The outdoor heat source unit according to claim 5, wherein the wide bandgap semiconductor is made of silicon carbide, a gallium nitride based material, or diamond.

8. The refrigeration cycle apparatus according to claim 3, wherein the fins of the heat sink are shaped as cylindrical columns.

9. The outdoor heat source unit according to claim 6, wherein the fins of the heat sink are shaped as cylindrical columns.

10. The refrigeration cycle apparatus according to claim 3, wherein the fins of the heat sink are shaped as prismatic columns.

11. The outdoor heat source unit according to claim 6, wherein the fins of the heat sink are shaped as prismatic columns.

12. The refrigeration cycle apparatus according to claim 3, wherein the fins of the heat sink are arranged in a horizontal-and-vertical matrix that includes at least two horizontal columns and at least two vertical rows.

13. The outdoor heat source unit according to claim 6, wherein the fins of the heat sink are arranged in a horizontal-and-vertical matrix that includes at least two horizontal columns and at least two vertical rows.

14. The refrigeration cycle apparatus according to claim 1, wherein the outdoor unit further includes a separator sheet metal that separates the refrigerant air-heat exchanger and fan from the switching device, temperature detection unit, control device, and heat sink, the separator sheet metal includes a hole the size of a heat sink that forcibly draws air across the heat sink and inverter device as the control device operates based on the detected temperature of the temperature detection unit.

15. The outdoor heat source unit according to claim 5, further comprising a separator sheet metal that separates the refrigerant air-heat exchanger and fan from the switching device, temperature detection unit, control device, and heat sink, the separator sheet metal includes a hole the size of a heat sink that forcibly draws air across the heat sink and inverter device as the control device operates based on the detected temperature of the temperature detection unit.

16. The refrigeration cycle apparatus according to claim 1, wherein the control device is further configured to separately perform an air conditioning operation and a water heating operation, and to perform an exhaust-heat recovery operation by simultaneously performing air cooling and water heating.

17. The refrigeration cycle apparatus according to claim 1, wherein the exhaust-heat recovery operation is a switching element heat recovery operation that recovers heat that radiates from the switching element.

18. The outdoor heat source unit according to claim 1, wherein the exhaust-heat recovery operation is a switching element heat recovery operation that recovers heat that radiates from the switching element.

* * * * *